(12) United States Patent
Ishikawa

(10) Patent No.: US 10,632,982 B2
(45) Date of Patent: Apr. 28, 2020

(54) BRAKING CONTROL DEVICE FOR VEHICLE

(71) Applicant: ADVICS CO., LTD., Kariya-shi, Aichi-ken (JP)

(72) Inventor: Motokazu Ishikawa, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 67 days.

(21) Appl. No.: 15/762,607

(22) PCT Filed: Oct. 20, 2016

(86) PCT No.: PCT/JP2016/081029
§ 371 (c)(1),
(2) Date: Mar. 23, 2018

(87) PCT Pub. No.: WO2017/069177
PCT Pub. Date: Apr. 27, 2017

(65) Prior Publication Data
US 2018/0273009 A1    Sep. 27, 2018

(30) Foreign Application Priority Data
Oct. 20, 2015 (JP) ................. 2015-206711

(51) Int. Cl.
*B60T 13/68* (2006.01)
*B60T 8/17* (2006.01)
(Continued)

(52) U.S. Cl.
CPC .......... *B60T 13/686* (2013.01); *B60T 7/042* (2013.01); *B60T 8/00* (2013.01); *B60T 8/17* (2013.01);
(Continued)

(58) Field of Classification Search
CPC .......... B60T 11/34; B60T 8/1831; B60T 8/00; B60T 13/58; B60T 13/662; B60T 13/68;
(Continued)

(56) References Cited

U.S. PATENT DOCUMENTS 5,294,191 A  *  3/1994  Giorgetti .................. B60L 7/10
                                                    180/165
5,312,172 A  *  5/1994  Takeuchi ................ B60T 7/042
                                                    303/113.1

(Continued)

FOREIGN PATENT DOCUMENTS

JP        2012-131263 A       7/2012

OTHER PUBLICATIONS

International Search Report (PCT/ISA/210) dated Dec. 6, 2016, by the Japanese Patent Office as the International Searching Authority for International Application No. PCT/JP2016/081029.

(Continued)

*Primary Examiner* — Bradley T King
*Assistant Examiner* — Mahbubur Rashid
(74) *Attorney, Agent, or Firm* — Buchanan Ingersoll & Rooney PC

(57) ABSTRACT

The present invention comprises: a first pressure-regulating mechanism that pressurizes a first wheel cylinder on either the left or right front wheel side of a vehicle, by using the movement of a first control piston driven by a first electric motor; a second pressure-regulating mechanism that pressurizes a second wheel cylinder on the other side, out of the left and right front wheels, by using the movement of a second control piston driven by a second electric motor; an opening/closing means interposed in a connection fluid path that connects the first wheel cylinder and the second wheel cylinder; and a control means. If the operation amount for a braking operation member is less than a prescribed value, (Continued)

the control means puts the opening/closing means in a connected state, puts the first electric motor in an electricity-supplied state, and puts the second electric motor in a non-electricity-supplied state.

2 Claims, 7 Drawing Sheets

(51) Int. Cl.
| | |
|---|---|
| *B60T 13/74* | (2006.01) |
| *B60T 8/40* | (2006.01) |
| *B60T 7/04* | (2006.01) |
| *B60T 13/66* | (2006.01) |
| *B60T 8/00* | (2006.01) |
| *B60T 11/20* | (2006.01) |
| *B60T 13/58* | (2006.01) |
| *B60T 8/26* | (2006.01) |

(52) U.S. Cl.
CPC .............. *B60T 8/4081* (2013.01); *B60T 11/20* (2013.01); *B60T 13/58* (2013.01); *B60T 13/662* (2013.01); *B60T 13/68* (2013.01); *B60T 13/745* (2013.01); *B60T 8/267* (2013.01); *B60T 2270/404* (2013.01); *B60T 2270/82* (2013.01)

(58) Field of Classification Search
CPC .. B60T 13/686; B60T 13/745; B60T 2270/82; B60T 7/042; B60T 8/17; B60T 8/4081
See application file for complete search history.

(56) References Cited

U.S. PATENT DOCUMENTS

| | | | | |
|---|---|---|---|---|
| 5,758,930 A | * | 6/1998 | Schiel | B60T 7/042 188/358 |
| 5,887,954 A | * | 3/1999 | Steiner | B60T 7/042 303/113.4 |
| 6,231,133 B1 | * | 5/2001 | Tsukamoto | B60T 8/326 303/115.2 |
| 6,328,388 B1 | * | 12/2001 | Mohr | B60T 8/24 188/156 |
| 6,345,871 B1 | * | 2/2002 | Harris | B60T 8/321 303/113.4 |
| 6,357,835 B1 | * | 3/2002 | Boisseau | B60T 8/00 303/113.5 |
| 6,761,418 B2 | * | 7/2004 | Nakamura | B60T 8/321 303/113.1 |
| 6,957,870 B2 | * | 10/2005 | Kagawa | B60T 8/367 303/113.4 |
| 2005/0275286 A1 | * | 12/2005 | Ohmori | B60T 8/36 303/155 |
| 2007/0024111 A1 | * | 2/2007 | Ganzel | B60T 8/3655 303/116.2 |
| 2008/0255732 A1 | * | 10/2008 | Yasui | B60T 8/442 701/48 |
| 2010/0026083 A1 | * | 2/2010 | Leiber | B60T 7/042 303/3 |
| 2010/0259096 A1 | * | 10/2010 | Rieth | B60T 8/4081 303/116.1 |
| 2011/0153147 A1 | * | 6/2011 | Watanabe | B60T 7/12 701/31.4 |
| 2011/0291470 A1 | * | 12/2011 | Drumm | B60T 1/10 303/3 |
| 2012/0151914 A1 | | 6/2012 | Nishioka et al. | |

OTHER PUBLICATIONS

Written Opinion (PCT/ISA/237) dated Dec. 6, 2016, by the Japanese Patent Office as the International Searching Authority for International Application No. PCT/JP2016/081029.

\* cited by examiner

BRAKING CONTROL DEVICE FOR VEHICLE

TECHNICAL FIELD

The present invention relates to a braking control device for a vehicle.

BACKGROUND ART

Patent Literature 1 describes that "in a state where a driver is not operating a brake pedal, a rod with a thread groove is located at its most retracted position in a motor-driven cylinder, together with which each piston biased by its corresponding return spring is retracted, and no braking fluid pressure is generated in both fluid pressure generating chambers. When the brake pedal is stepped on and a detected value in a stroke sensor becomes greater than 0, a braking fluid pressure corresponding to a braking volume of the brake pedal (brake operation volume) as an input is generated in a first fluid pressure generating chamber, and at the same time a second piston is displaced against biasing force of the return spring by being pressed by the fluid pressure in the first fluid pressure generating chamber, and a braking fluid pressure is similarly generated in a second fluid pressure generating chamber as well".

In a braking control device described in Patent Literature 1, the pistons are pressed to the most retracted positions (initial positions) by the return springs in the state where the brake pedal (brake operation member) is not operated. Further, when the brake pedal is stepped on, the pistons displace against the biasing force (spring force) of the return springs, and the braking fluid pressures are generated in the fluid pressure generating chambers. At this occasion, the pistons do not return to the initial positions easily if the spring force of the return spring is small, whereas in a case where the spring force of the return springs is large, large-sized electric motors to handle such spring force become necessary. That is, a trade-off relationship exists between the return springs and the size of the electric motors. A configuration that allows pistons to return to initial positions despite spring force of return springs being small is desired to make a braking control device compact.

CITATIONS LIST

Patent Literature

Patent Literature 1: JP 2012-131263 A

SUMMARY OF INVENTION

Technical Problems

An aim of the present invention is to provide a braking control device for a vehicle that ensures pistons to return to initial positions even in an event where return springs with small spring force are employed.

Solutions to Problems

A braking control device for a vehicle according to the present invention includes an operation volume acquiring means (BPA) configured to acquire an operation volume (Bpa) of a brake operation member (BP) of the vehicle; a first wheel cylinder (WC1) configured to apply brake torque on one side of left and right front wheels (WHfl, WHfr) of the vehicle; a second wheel cylinder (WC2) configured to apply brake torque on another side of the left and right front wheels (WHfl, WHfr) of the vehicle; a first pressure-regulating mechanism (CA1) configured to pressurize brake fluid in the first wheel cylinder (WC1) by motion of a first control piston (PS1) inside a first control cylinder (SC1), the first control piston being configured to be driven by a first electric motor (MT1); a second pressure-regulating mechanism (CA2) configured to pressurize brake fluid in the second wheel cylinder (WC2) by motion of a second control piston (PS2) inside a second control cylinder (SC2), the second control piston being configured to be driven by a second electric motor (MT2); an opening/closing means (VRN) interposed on a connection fluid path (HRN) connecting the first wheel cylinder (WC1) and the second wheel cylinder (WC2), and configured to selectively produce a flowing state and an interrupted state of the brake fluid between the first wheel cylinder (WC1) and the second wheel cylinder (WC2); and a control means (CTL) configured to control the first and second electric motors (MT1, MT2) and the opening/closing means (VRN) based on the operation volume (Bpa).

The characteristics of the braking control device for a vehicle according to the present invention are in that the control means (CTL): brings the opening/closing means (VRN) to be in the flowing state, brings the first electric motor (MT1) to be in an electricity-supplied state, and brings the second electric motor (MT2) to be in a non-electricity-supplied state in a case where the operation volume (Bpa) is less than a prescribed value (bpm); and brings the opening/closing means (VRN) to be in the interrupted state, and brings the first and second electric motors (MT1, MT2) to be in the electricity-supplied state in a case where the operation volume (Bpa) is equal to or greater than the prescribed value (bpm).

According to the above configuration, in fluid paths of two systems, the fluid pressure of the system on one side, which is generated by the electric motor being brought to the electricity-supplied state by the connection valve being brought to the open position, is supplied to the system on the other side in which the electric motor is brought to the non-electricity-supplied state. With this fluid pressure, the control piston in the system on the other side is returned to an initial position. As a result, return springs with small spring force may be employed, and the electric motors can be made compact.

DESCRIPTION OF EMBODIMENTS

Embodiments of a braking control device for a vehicle according to the present invention will be described with reference to the drawings. In the description below, the added letters (such as "fl") that are added to respective reference signs indicate the respective reference signs relate to which wheels. Specifically, "fl" indicates a left front wheel, "fr" indicates a right front wheel, "rl" indicates a left rear wheel, and "rr" indicates a right rear wheel. For example, the respective wheel cylinders will be denoted as a left front wheel cylinder WCfl, a right front wheel cylinder WCfr, a left rear wheel cylinder WCrl, and a right rear wheel cylinder WCrr.

Further, the numbers ("1" or "2") added to the respective signs indicate two fluid paths (fluid pressure systems) are connected to which one of the left front wheel cylinder WCfl and the right front wheel cylinder WCfr. Specifically, a system connected to the left front wheel cylinder WCfl (hereafter termed a first system) is expressed using "1", and a system connected to the right front wheel cylinder WCfr (hereafter termed a second system) is expressed using "2". For example, a first pressure-regulating mechanism CA1 is for adjusting fluid pressure of the left front wheel cylinder WCfl (corresponding to a first wheel cylinder WC1) and a second pressure-regulating mechanism CA2 is for adjusting fluid pressure of the right front wheel cylinder WCfr (corresponding to a second wheel cylinder WC2). In each of the constituent features, configurations of the first system (first fluid path) and configurations of the second system (second fluid path) are same. Due to this, the description hereinbelow will be given mainly for the constituent features of the first system.

<First Embodiment of Braking Control Device According to the Present Invention>

Figure 1:
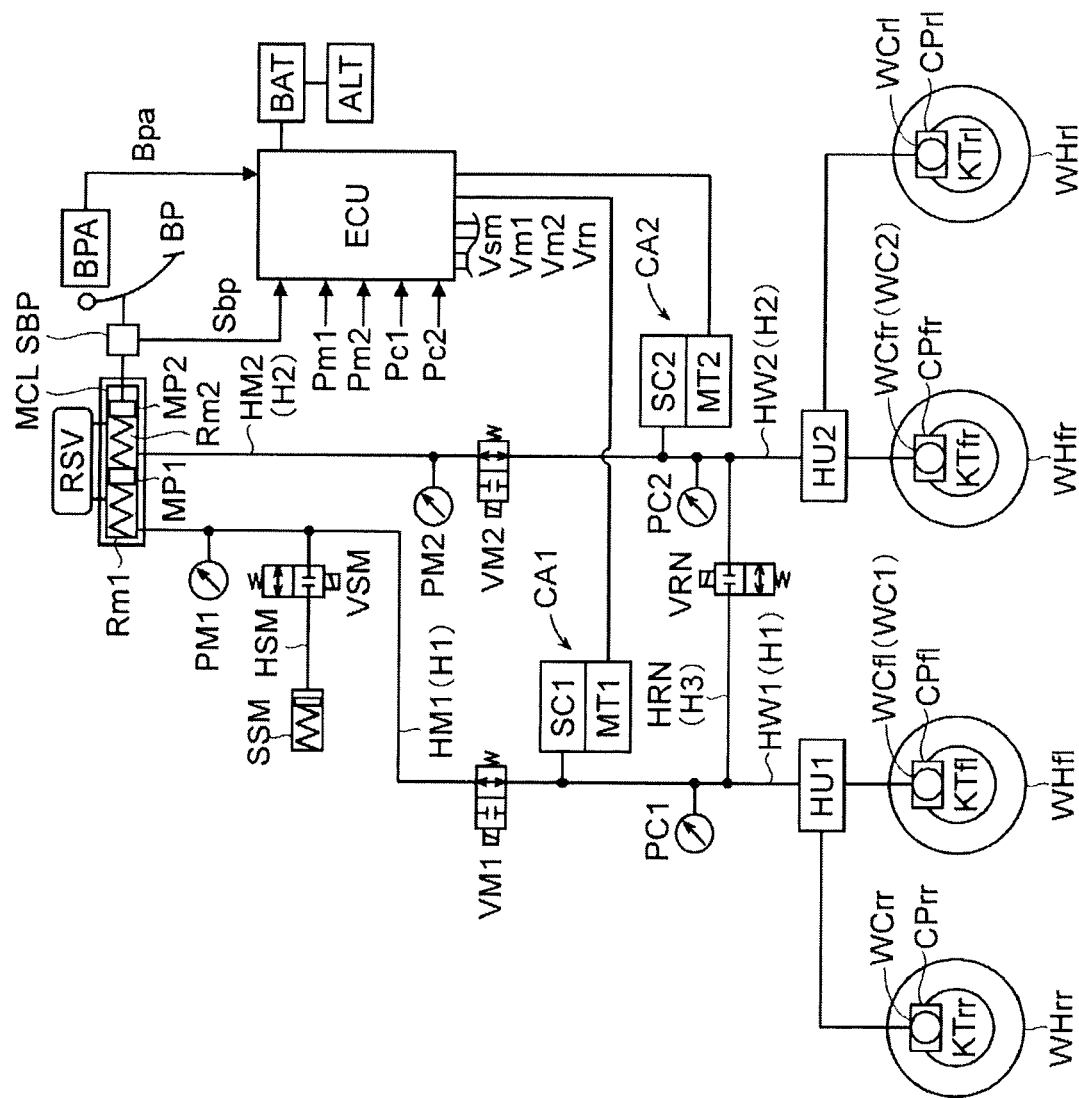
FIG. 1 is an overall configurational diagram showing a first embodiment of a braking control device for a vehicle according to the present invention.

A first embodiment of a braking control device according to the present invention will be described with reference to an overall configurational diagram of FIG. 1. As shown in the overview configurational diagram, a vehicle provided with the braking control device is provided with a brake operation member BP, an operation volume acquiring means BPA, an electronic control unit ECU, a tandem master cylinder MCL, a stroke simulator SSM, electromagnetic valves VM1, VM2, VSM, VRN, and first and second pressure-regulating mechanisms CA1, CA2. Further, the wheels WHfl, WCfr, WHrl, WHrr are respectively provided with brake calipers CPfl, CPfr, CPrl, CPrr, wheel cylinders WCfl, WCfr, WCrl, WCrr, and rotary members (for example, brake disks) KTfl, KTfr, KTrl, KTrr.

A brake operation member (for example, brake pedal) BP is a member to be operated by a driver to decelerate the vehicle. When the brake operation member BP is operated, brake torque of the wheels (WHfl, etc.) is adjusted, and braking force is generated in the wheels. Specifically, the rotary member (for example, a brake disk) is fixed to each wheel of the vehicle. The brake calipers (CPfl, etc.) are arranged to interpose the rotary members (KTfl, etc.) therein. Further, the wheel cylinders (WCfl, etc.) are provided on the brake calipers. When pressure of the brake fluid inside the wheel cylinders is increased, frictional members (for example, brake pads) are pressed against the rotary members. Frictional force generated upon this pressing generates the brake torque in the wheel.

The brake operation member BP is provided with an operation volume acquiring means BPA. The operation volume acquiring means BPA acquires (detects) the driver's operation volume (braking operation volume) Bpa of the brake operation member BP. Specifically, as the operation volume acquiring means BPA, at least one of first and second master cylinder fluid pressure acquiring means (pressure sensors) PM1, PM2 that acquire pressure of the tandem master cylinder MCL, an operation displacement acquiring means (stroke sensor) SBP that acquires an operational displacement Sbp of the brake operation member BP, and an operational force acquiring means (tread force sensor) FBP (not shown) that acquires an operational force Fbp of the brake operation member BP may be employed. In other words, the operation volume acquiring means BPA is a collective term for the master cylinder fluid pressure acquiring means, the operation displacement acquiring means, and the operational force acquiring means. The braking operation volume Bpa is determined based on at least one of first and second master cylinder fluid pressures Pm1, Pm2, the operational displacement Sbp of the brake operation member, and the operational force Fbp of the brake operation member. Here, one of the first and second master cylinder fluid pressure acquiring means PM1, PM2 may be omitted.

The braking operation volume Bpa (Pm1, Sbp, etc.) is inputted to the electronic control unit ECU. Power is supplied to the electronic control unit ECU by a rechargeable battery (battery) BAT and a generator (alternator) ALT. The first and second pressure-regulating mechanisms CA1, CA2 and the electromagnetic valves VM1, VM2, VSM, VRN are controlled by the electronic control unit ECU based on the braking operation volume Bpa. Specifically, the electronic control unit ECU is programmed with a control algorithm for controlling electric motors MT1, MT2 and the electromagnetic valves VM1, VM2, VSM, VRN.

First and second control cylinder fluid pressures Pc1, Pc2 acquired by first and second control cylinder fluid pressure acquiring means PC1, PC2 are inputted to the electronic control unit ECU. In the electronic control unit ECU, driving signals It1, It2 for the electric motors MT1, MT2 and instruction signals Vm1, Vm2, Vsm, Vrn for the electromagnetic valves VM1, VM2, VSM, VRN are calculated, and the electric motors and the electromagnetic valves are controlled based on these signals.

The tandem master cylinder (which may simply be termed a master cylinder) MCL converts the operational force (brake pedal tread force) on the brake operation member BP to a fluid pressure, and pressurizes and feeds brake fluid to the wheel cylinders of the respective wheels. Specifically, first and second master cylinder chambers Rm1, Rm2 defined by two master pistons MP1, MP2 are formed in the master cylinder MCL, and these are connected to the wheel cylinders of the respective wheels via fluid paths (pipes). In a case where the brake operation member BP is not operated, the master cylinder chambers Rm1, Rm2 are in a flowing state with a master reservoir RSV, and the fluid pressure inside the master cylinder is at atmospheric pressure.

<Fluid Paths of Two Systems (Diagonal Piping)>

Paths through which the brake fluid (brake fluid) moves among the tandem master cylinder MCL and the four-wheel cylinders WCfl, WCfr, WCrl, WCrr (fluid paths) are configured of two systems. In one of the systems (first fluid path H1), the first fluid pressure chamber Rm1 of the master cylinder MCL and the wheel cylinders WCfl (corresponding to first wheel cylinder WC1), WCrr are connected. In the other of the systems (second fluid path H2), the second fluid pressure chamber Rm2 of the master cylinder MCL and the wheel cylinders WCfr (corresponding to second wheel cylinder WC2), WCrl are connected. A configuration of a so-called diagonal piping (which may also be termed X piping) is employed. Since a configuration of the first fluid path (first brake piping) H1 and a configuration of the second fluid path (second brake piping) H2 are basically the same, the configuration of the first fluid path H1 will be described.

A first master cylinder shutoff valve VM1 is provided (interposed) on the fluid path H1 connecting the first fluid pressure chamber (first master cylinder chamber) Rm1 of the master cylinder MCL and the wheel cylinders WCfl, WCrr. The first master cylinder shutoff valve VM1 is a two-position electromagnetic valve having an open position and a closed position. In a case where the first master cylinder shutoff valve VM1 is in the open position, the first master cylinder chamber Rm1 and the left front wheel cylinder WCfl are in a flowing state, and in a case where VM1 is in the closed position, Rm1 and WCfl are in an interrupted state (non-flowing state). As the first master cylinder shutoff valve VM1, a normally-open electromagnetic valve (NO valve) may be employed.

A first fluid pressure unit HU1 is interposed on a fluid path HW1 (being a part of H1) connecting the first master cylinder shutoff valve VM1 and the wheel cylinders WCfl, WCrr. Here, the first fluid path (first brake piping) is configured by a fluid path (piping) HM1 and the fluid path (piping) HW1. The first fluid pressure unit HU1 is configured of a booster valve and a reducing valve, and controls fluid pressures of the wheel cylinders WCfl, WCrr independently upon executing anti-skidding control, vehicle stabilization control, and the like.

In the fluid path HW1, the first pressure-regulating mechanism CA1 and the first control cylinder fluid pressure acquiring means PC1 are provided between the first master cylinder shutoff valve VM1 and the first fluid pressure unit HU1. The first pressure-regulating mechanism CA1 is configured of a first control cylinder SC1 and the first electric motor MT1. In the case where the first master cylinder shutoff valve VM1 is in the closed position, it adjusts (boosts or reduces) the fluid pressures of the wheel cylinders WCfl, WCrr. The fluid pressure Pc1 adjusted by the first pressure-regulating mechanism CA1 is acquired (detected) by the first control cylinder fluid pressure acquiring means PC1.

The first master cylinder fluid pressure acquiring means PM1 is provided on the fluid path HM1 (which is a part of H1) connecting the first master cylinder chamber Rm1 and the first master cylinder shutoff valve VM1. The master cylinder fluid pressure Pm1 generated by the master cylinder MCL is acquired (detected) by the first master cylinder fluid pressure acquiring means PM1.

The stroke simulator (which may simply be termed a simulator) SSM is provided for causing the brake operation member BP to generate the operational force. The simulator shutoff valve VSM is provided on the fluid path HSM connecting the first fluid pressure chamber Rm1 of the master cylinder MCL and the simulator SSM. The simulator shutoff valve VSM is a two-position electromagnetic valve having an open position and a closed position. In a case where the simulator shutoff valve VSM is in the open position, the first master cylinder chamber Rm1 and the simulator SSM are in a flowing state, and in a case where VSM is in the closed position, Rm1 and SSM are in an interrupted state (non-flowing state). As the simulator shutoff valve VSM, a normally-closed electromagnetic valve (NC valve) may be employed.

A piston and an elastic body (for example, a compression spring) are provided inside the simulator SSM. The brake fluid is moved from the master cylinder MCL (Rm1) to the simulator SSM, and the inflowing brake fluid presses the piston. The piston is biased by the elastic body toward a direction of inhibiting the inflow of the brake fluid. The elastic body creates the operational force (for example, brake pedal tread force) for the case where the brake operation member BP is operated.

Next, the configuration of the second fluid path H2 will be briefly described. As aforementioned, the configuration of the first fluid path H1 and the configuration of the second fluid path H2 are basically the same. Thus, Rm1 corresponds to Rm2, WHfl (WC1) corresponds to WCfr (WC2), WCrr corresponds to WCrl, HM1 corresponds to HM2, HW1 corresponds to HW2, HU1 corresponds to HU2, VM1 corresponds to VM2, CA1 corresponds to CA2, PM1 corresponds to PM2, and PC1 corresponds to PC2, respectively. That is, a description that replaced "first" to "second" and "1" at the end of the signs to "2" in the description of the constituent features of the first fluid path H1 corresponds to the description of the constituent features of the second fluid path H2. Here, the stroke simulator is omitted in the constituent features of the second fluid path H2; however, an independent stroke simulator may be provided in the second fluid path H2 as well.

Further, a connection fluid path HRN (H3) connecting the first fluid path H1 and the second fluid path H2 is provided. That is, the first pressure-regulating mechanism CA1 and the second pressure-regulating mechanism CA2 are hydrodynamically connected by the connection fluid path HRN. A connection valve VRN (corresponding to opening/closing means) is provided on the connection fluid path HRN. The connection valve VRN is a normally-closed, two-position electromagnetic valve. In a case where the connection valve VRN is in an open position, the first pressure-regulating mechanism CA1 (that is, the first wheel cylinder WCfl, etc.) and the second pressure-regulating mechanism CA2 (that is, the second wheel cylinder WCfr, etc.) are in a flowing state. On the other hand, in a case where the connection valve VRN is in a closed position, the first pressure-regulating mechanism CA1 and the second pressure-regulating mechanism CA2 are in a non-flowing state.

<Pressure-Regulating Mechanism>

Figure 2:
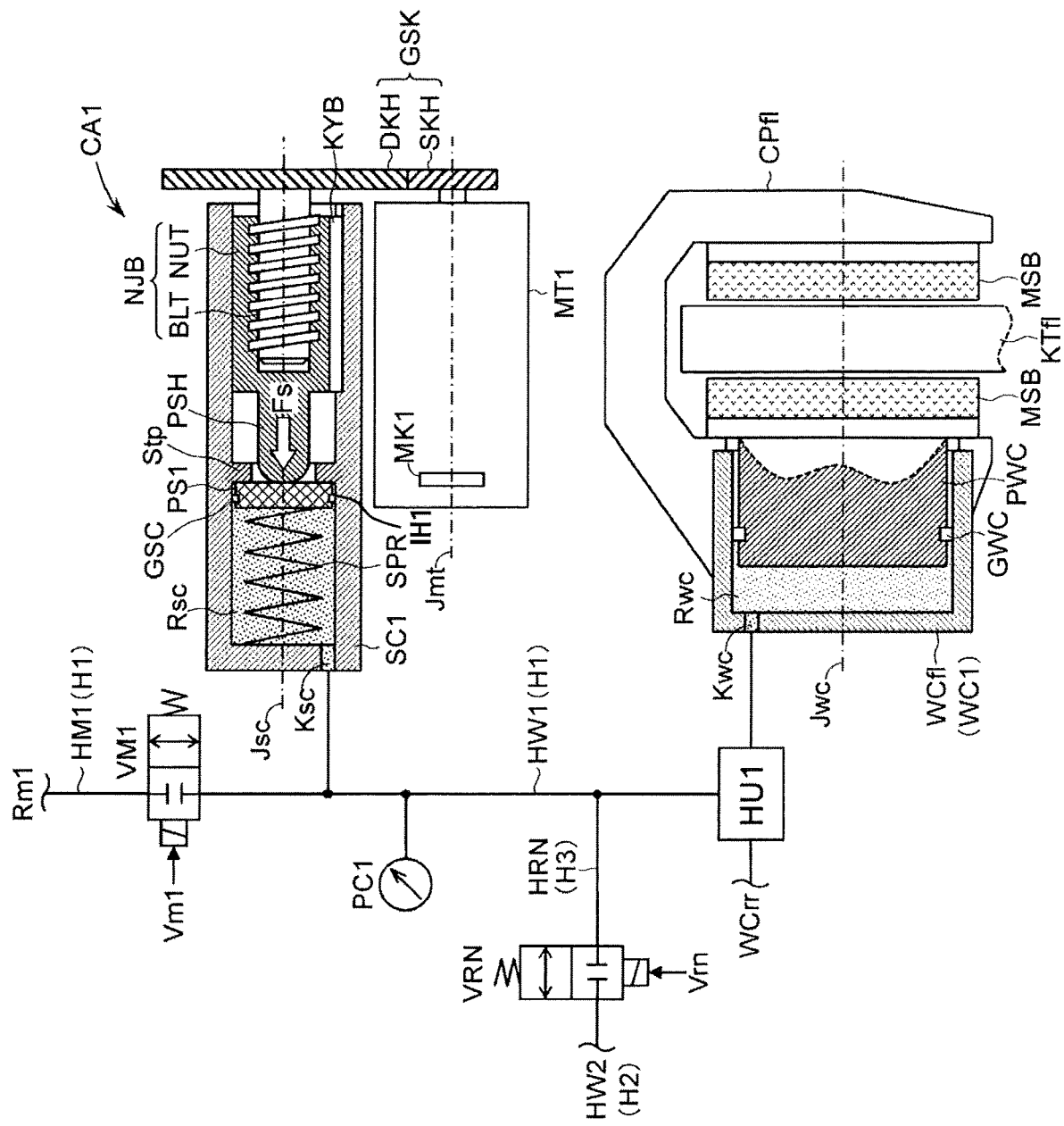
FIG. 2 is a partial cross-sectional diagram for explaining a pressure-regulating mechanism.
Figure 3:
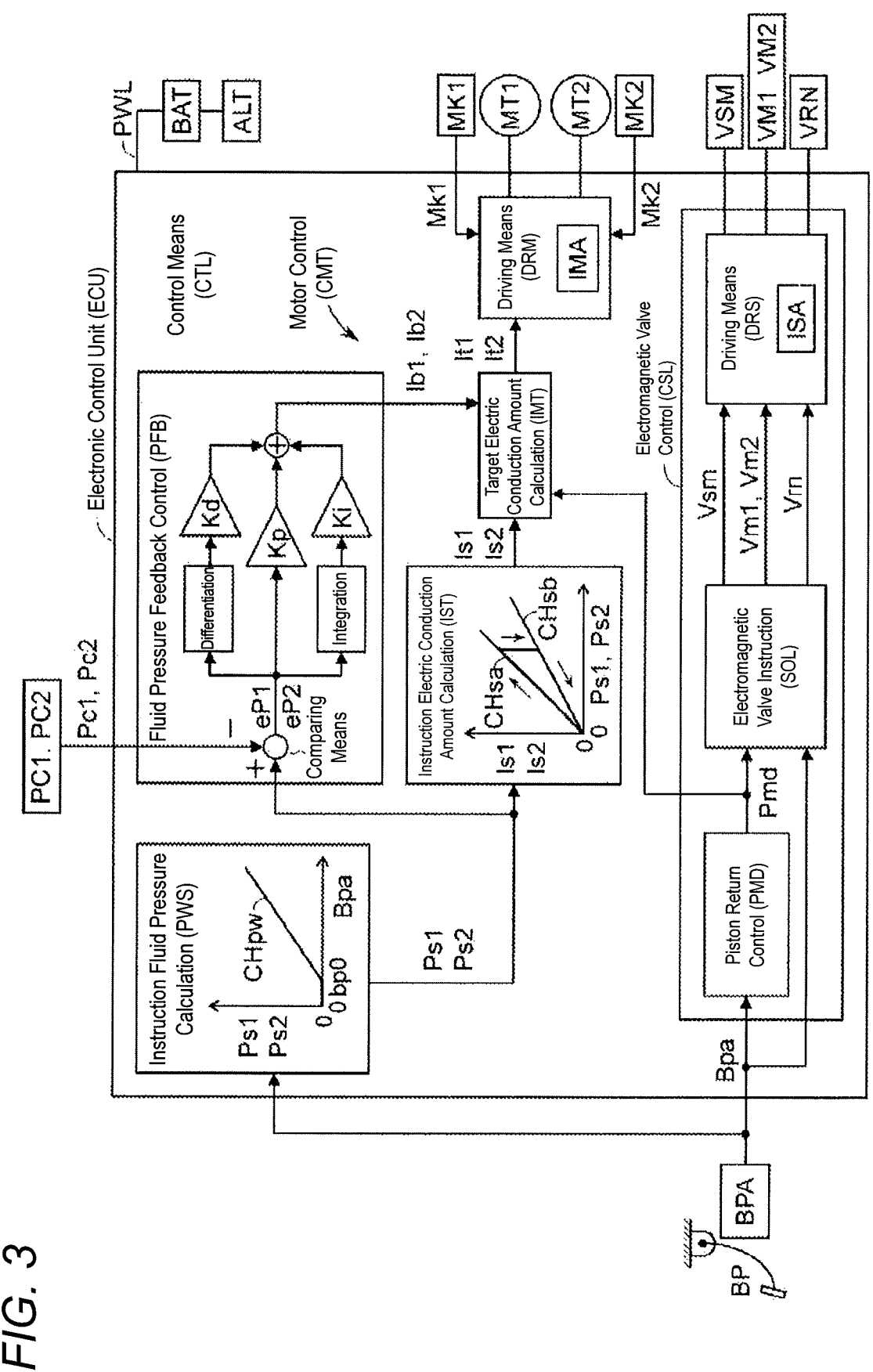
FIG. 3 is a functional block diagram for explaining a calculation process by an electronic control unit.

Details of the pressure-regulating mechanism will be described with reference to a partial cross-sectional diagram of FIG. 2. Since the first pressure-regulating mechanism CA1 (especially the configuration corresponding to the left front wheel WHfl) and the second pressure-regulating mechanism CA2 (especially the configuration corresponding to the right front wheel WHfr) have a same configuration, the first pressure-regulating mechanism CA1 will be described. For the description of the second pressure-regulating mechanism CA2, it may be explained by replacing "first" to "second", added letter "1" to added letter "2", added letter "fl" to added letter "fr", and added letter "rr" to added letter "rl".

The first pressure-regulating mechanism CA1 is provided on the first fluid path H1 on an opposite side from the master cylinder MCL with respect to the first master cylinder shutoff valve (electromagnetic valve) VM1 (that is, on a wheel cylinder WCfl side). Thus, in the case where the electromagnetic valve VM1 is in the closed position (interrupted state), the fluid pressure of the wheel cylinder WCfl, etc. is adjusted by input and output of the brake fluid from the first pressure-regulating mechanism CA1.

The first pressure-regulating mechanism CA1 is configured of the first electric motor MT1, a reduction gear GSK, a rotation-linear motion converting mechanism (screw member) NJB, a pressing member PSH, the first control cylinder SC1, a first control piston PS1, and a return spring SPR.

The first electric motor MT1 is a power source for the first pressure-regulating mechanism CA1 to adjust (boost, reduce, etc.) the pressures of the brake fluid in the wheel cylinders. The first electric motor MT1 is driven by the electronic control unit ECU. As the first electric motor MT1, a brushless DC motor may be employed.

The reduction gear GSK is configured of a small diameter gear SKH and a large diameter gear DKH. Here, a number of teeth of the large diameter gear DKH is greater than a number of teeth of the small diameter gear SKH. Thus, rotational force of the electric motor MT1 is reduced by the reduction gear GSK and is transmitted to the screw member NJB. Specifically, the small diameter gear SKH is fixed to an output shaft Jmt of the electric motor MT1. The large diameter gear DKH is meshed with the small diameter gear SKH, and the large diameter gear DKH and a bolt member BLT of the screw member NJB are fixed so that a rotation shaft Jsc of the large diameter gear DKH coincides with a rotation shaft of the bolt member BLT. That is, in the reduction gear GSK, the rotational force from the electric motor MT1 is inputted to the small diameter gear SKH, is reduced, and then outputted from the large diameter gear DKH to the screw member NJB.

The screw member NJB converts the rotational force of the reduction gear GSK to a linear motion force Fs of the pressing member PSH. A nut member NUT is fixed to the pressing member PSH. The bolt member BLT of the screw member NJB is fixed coaxially with the large diameter gear DKH. Rotational motion of the nut member NUT is constrained by a key member KYB, so the nut member NUT (that is, the pressing member PSH) engaged by thread with the bolt member BLT is moved in a direction of the rotation shaft of the large diameter gear DKH by rotation of DKH. That is, the screw member NJB converts the rotational force of the first electric motor MT1 to the linear motion force Fs of the pressing member PSH.

The first control piston PS1 is moved by the pressing member PSH. The first control piston PS1 is inserted into an inner hole IH1 (first inner hole) of the first control cylinder SC1, and a combination of a piston and cylinder is thereby formed. Specifically, a sealing member GSC is provided on an outer circumference of the first control piston PS1, and fluid tightness with the inner hole (inner wall) of the first control cylinder SC1 is ensured. That is, a fluid chamber (control cylinder chamber) Rsc defined by the first control cylinder SC1 and the first control piston PS1 is thereby formed. The control cylinder chamber Rsc is connected to the fluid path (piping) HW1 via a port Ksc. With the first control piston PS1 being moved in an axial direction (center axis Jsc), a volume of the control cylinder chamber Rsc thereby changes. At this occasion, since the electromagnetic valve VM1 is in the closed position, the brake fluid is not moved to a direction of the master cylinder MCL (that is, the master cylinder chamber Rm1), but is moved toward the wheel cylinder WCfl.

The first pressure-regulating mechanism CA1 is provided with the return spring (elastic body) SPR. When power conduction to the first electric motor MT1 is stopped, the first control piston PS1 is returned to an initial position (position corresponding to the brake fluid pressure being zero) by the return spring SPR. Specifically, a stopper portion Stp is provided inside the first control cylinder SC1, and in a case where the output of the first electric motor MT1 is zero, the first control piston PS1 is pressed to a position where it makes contact with the stopper portion Stp (initial position) by the return spring SPR.

The brake caliper CPfl is of a floating type, and the wheel cylinder WCfl is provided therein. A wheel piston PWC is inserted to an inner hole of the wheel cylinder WCfl, and a combination of a piston and a cylinder is thereby formed. A sealing member GWC is provided on an outer circumference of the wheel piston PWC, and fluid tightness between GWC and the inner hole (inner wall) of the wheel cylinder WCfl is achieved. That is, the sealing member GWC of the wheel cylinder forms a fluid chamber (wheel cylinder chamber) Rwc defined by the wheel cylinder WCfl and the wheel piston PWC. The wheel piston PWC is connected to the frictional member MSB, and is configured capable of pressing MSB.

The wheel cylinder chamber Rwc formed by a combination of the wheel piston PWC and the wheel cylinder WCfl is filled with the brake fluid. Further, the fluid chamber Rwc is connected to the fluid path (piping) HW1 via the port Kwc. Accordingly, when the first control piston PS1 is reciprocated by the first electric motor MT1 in a direction of a center axis Jsc and a volume of the control cylinder chamber Rsc is increased or decreased, a pressure change in the brake fluid in the wheel cylinder chamber Rwc occurs due to inflow or outflow of the brake fluid to the wheel cylinder chamber Rwc. Due to this, the force by which the frictional member (for example, brake pad) MSB presses the rotary member (for example, brake disk) KTfl is adjusted, and the brake torque of the wheel WHfl is thereby controlled.

Specifically, when the first electric motor MT1 is rotary driven in a forward direction Fwd, the first control piston PS1 is moved to decrease a volume of the control cylinder chamber Rsc (movement to left direction in the drawings), and the brake fluid is moved from the first control cylinder SC1 to the first wheel cylinder WCfl. Due to this, a volume of the wheel cylinder chamber Rwc is increased, the pressing force of the frictional member MSB onto the rotary member KTfl increases, and the brake torque of the wheel WHfl increases. On the other hand, when the first electric motor MT1 is rotary driven in a reverse direction Rvs, the first control piston PS1 is moved to increase the volume of the control cylinder chamber Rsc (movement to right direction in the drawings), and the brake fluid is moved from the first wheel cylinder WCfl to the first control cylinder SC1. Due to this, the volume of the wheel cylinder chamber Rwc is decreased, the pressing force of the frictional member MSB onto the rotary member KTfl decreases, and the brake torque of the wheel WHfl decreases.

In order to control the brake fluid pressures independently for each wheel in the anti-skidding control, the vehicle stabilization control, and the like, the first fluid pressure unit HU1 is provided between the first pressure-regulating mechanism CA1 (that is, the first control cylinder SC1) and the wheel cylinders WCfl, WCrr. The first fluid pressure unit HU1 is configured of a combination of a booster valve (electromagnetic valve) and a reducing valve (electromagnetic valve). In a case of retaining the wheel cylinder fluid pressure, the booster valve and the reducing valve are brought to a closed position, and inflow of the brake fluid from the first pressure-regulating mechanism CA1 to the wheel cylinder is inhibited. In a case of decreasing the wheel cylinder fluid pressure, the reducing valve is brought to an open position in a state of having the booster valve in the closed position, and the brake fluid is returned to the master reservoir RSV. Further, in a case of increasing the wheel cylinder fluid pressure, the reducing valve is brought to the closed position and the booster valve is brought to an open position, and the brake fluid flows into the wheel cylinder from the first pressure-regulating mechanism CA1.

In the first fluid path (brake piping) HW1, the first control cylinder fluid pressure acquiring means (pressure sensor) PC1 is provided between the first master cylinder shutoff valve VM1 and the first fluid pressure unit HU1. The fluid pressure (first control cylinder fluid pressure) Pc1 outputted by the first control cylinder SC1 is acquired (detected) by the first fluid pressure acquiring means PC1.

In between the first master cylinder shutoff valve VM1 and the first fluid pressure unit HU1, the first fluid path (brake piping) HW1 is connected to the second fluid path (brake piping) HW2 via the connection fluid path (brake piping) HRN. The connection valve VRN is interposed on the connection fluid path HRN. In a state where the connection valve VRN is in the open position, the connection fluid path HRN is in a flowing state, and when it is in the closed position, the connection fluid path HRN is in an interrupted state. Thus, the hydrodynamic connection (connection/no-connection) of the first pressure-regulating mechanism CA1 and the second pressure-regulating mechanism CA2 is switched by opening and closing the connection valve VRN.

<Process in Electronic Control Unit ECU>

Figure 4:
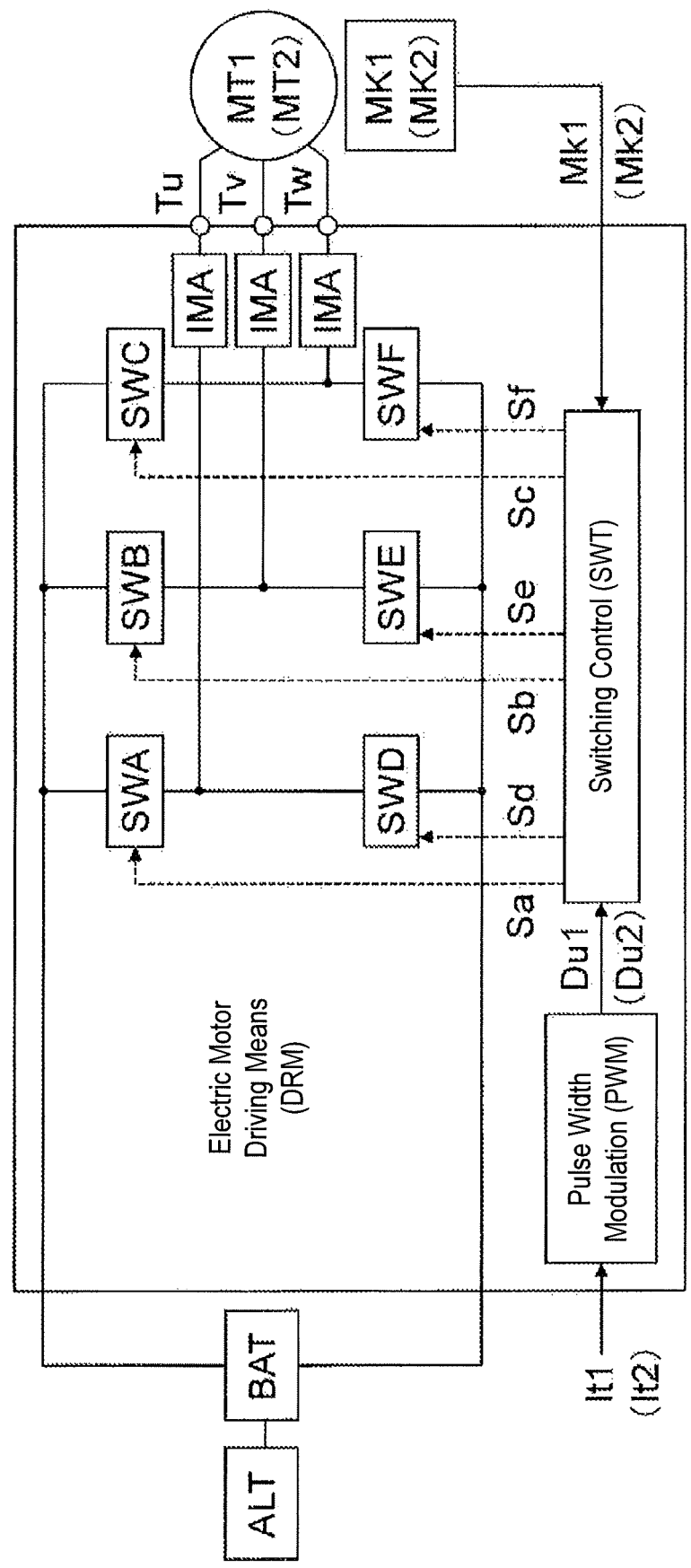
FIG. 4 is a circuitry diagram for explaining an electric motor driving means.

Next, a process in the electronic control unit ECU will be described with reference to a functional block diagram of FIG. 4. The electronic control unit ECU receives power supply from the power source (rechargeable battery BAT, generator ALT), and controls the first and second electric motors MT1, MT2, the stroke simulator shutoff valve (electromagnetic valve) VSM, the first and second master cylinder shutoff valves (electromagnetic valves) VM1, VM2, and the connection valve (electromagnetic valve) VRN. The process in the electronic control unit ECU is configured by a motor controlling part CMT and an electromagnetic valve controlling part CSL. Here, the motor controlling part CMT and the electromagnetic valve controlling part CSL are termed "control means CTL".

<<Motor Controlling Part CMT>>

The motor controlling part, CMT (which is a part of the control means CTL) is configured of an instruction fluid pressure calculating block PWS, an instruction electric conduction amount calculating block IST, a fluid pressure feedback controlling block PFB, and a target electric conduction amount calculating block IMT.

In the instruction fluid pressure calculating block PWS, first and second instruction fluid pressures Ps1, Ps2 are calculated based on the braking operation volume Bpa and a calculation characteristic (calculation map) CHpw. Here, the first and second instruction fluid pressures Ps1, Ps2 are target values of the brake fluid pressure to be generated by the first and second pressure-regulating mechanisms CA1, CA2. Specifically, the first and second instruction fluid pressures Ps1, Ps2 are calculated as zero in a range where the braking operation volume Bpa is equal to or greater than zero (corresponding to a case where the braking operation is not performed) and less than a prescribed value bp0 in the calculation characteristic CHpw, and the first and second instruction fluid pressures Ps1, Ps2 are calculated to increase from zero according to the increase of the operation volume Bpa when the operation volume Bpa is equal to or greater than the prescribed value bp0.

In the instruction electric conduction amount calculating block IST, instruction electric conduction amounts Is1, Is2 (target values of the electric conduction amount for controlling MT1, MT2) for the first and second electric motors MT1, MT2 that drive the first and second pressure-regulating mechanisms CA1, CA2 are calculated based on the first and second instruction fluid pressures Ps1, Ps2, etc. Here, the "electric conduction amount" is the state quantity (variant) for controlling the output torque of the first and second electric motors MT1, MT2. Since the first and second electric motors MT1, MT2 output the torque which substantially is proportional to current, current target values to the electric motors MT1, MT2 are used as the target values of the electric conduction amounts (target electric conduction amounts). Further, when the supplied voltages to the first and second electric motors MT1, MT2 are increased, the current thereof is increased as a result, so the supplied voltage values are used as the target electric conduction amounts. Moreover, since the supplied voltage values may be adjusted by duty ratio of pulse width modulation, this duty ratio (ratio of electrically conducted time period within a cycle) may be used as the electric conduction amounts.

In the instruction electric conduction amount calculating block IST, signs (positive or negative sign for the values) of the first and second instruction electric conduction amounts Is1, Is2 are determined based on directions toward which the first and second electric motors MT1, MT2 should rotate (that is, increasing and decreasing directions of the fluid pressure). Further, magnitudes of the first and second instruction electric conduction amounts Is1, Is2 are calculated based on the rotational power (that is, increasing and decreasing amounts of the fluid pressure) that the first and second electric motors MT1, MT2 should output. Specifically, in a case of increasing the brake fluid pressure, the signs of the first and second instruction electric conduction amounts Is1, Is2 are calculated as positive signs (It1, It2>0), and the first and second electric motors MT1, MT2 are driven in the forward direction Fwd. On the other hand, in a case of decreasing the brake fluid pressure, the signs of the first and second instruction electric conduction amounts Is1, Is2 are determined as negative signs (Is1, Is2<0), and the first and second electric motors MT1, MT2 are driven in the reverse direction Rvs. Moreover, the output torque (rotational power) of the first and second electric motors MT1, MT2 is controlled to be larger with larger absolute values of the first and second instruction electric conduction amounts Is1, Is2, and the output torque is controlled to be smaller for smaller absolute values of It1, It2.

In the fluid pressure feedback controlling block PFB, feedback electric conduction amounts Ib1, Ib2 of the first and second electric motors MT1, MT2 are calculated based on the first and second target values (instruction fluid pressures) Ps1, Ps2 of the fluid pressure and the first and second actual values Pc1, Pc2 of the fluid pressure. Here, the first and second actual values Pc1, Pc2 are actual values of the fluid pressure (actual fluid pressures) acquired (detected) by the control cylinder fluid pressure acquiring means (pressure sensors) PC1, PC2. In the fluid pressure feedback controlling block PFB, deviations eP1, eP2 of the first and second instruction fluid pressures Ps1, Ps2 and the first and second actual fluid pressures Pc1, Pc2 are calculated. The fluid pressure deviations eP1, eP2 are subjected to differential and integral calculations and gains Kp, Kd, Ki are multiplied thereto, as a result of which the first and second feedback electric conduction amounts Ib1, Ib2 are calculated. In the fluid pressure feedback controlling block PFB, a so-called fluid pressure-based PID control is executed.

In the target electric conduction amount calculating block IMT, the first and second target electric conduction amounts It1, It2, which are the final target values of the electric conduction amounts are calculated based on the first and second instruction electric conduction amounts Is1, Is2 and the first and second feedback electric conduction amounts Ib1, Ib2. Specifically, in the electric conduction amount adjustment calculating block IMT, the first and second feedback electric conduction amounts Ib1, Ib2 are added to the first and second instruction electric conduction amounts Is1, Is2, and sums thereof are calculated as the first and second target electric conduction amounts It1, It2 (It1=Is1+Ib1, It2=Is2+Ib2). That is to say, the first and second target electric conduction amounts It1, It2 are calculated based on electric conduction amount feedback control. This case is termed "normal electric conduction". Further, in the target electric conduction amount calculating block IMT, the first and second target electric conduction amounts It1, It2 are calculated based on a piston return control signal Pmd to be described later. This case is termed "specific electric conduction", to distinguish it from the aforementioned normal electric conduction.

In the electric motor driving means (driving circuit) DRM, the rotational power (outputs) of the first and second electric motors MT1, MT2 and the rotation directions thereof are adjusted based on the first and second target electric conduction amounts It1, It2. Details of the driving means DRM will be described later.

<<Electromagnetic Valve Controlling Part CSL>>

The electromagnetic valve controlling part CSL (which is a part of the control means CTL) is configured of a piston return control block PMD, an electromagnetic valve instructing block SOL and an electromagnetic valve driving means DRS. Here, control to return the first and second control pistons PS1, PS2 in the pressure-regulating mechanism CA1, CA2 to their initial positions by internal pressure of the control cylinder chamber Rsc will be termed "piston return control".

In the piston return control block PMD, the control signal Pmd for executing the return control of the first and second control pistons PS1, PS2 is created based on the braking operation volume Bpa. In the electromagnetic valve instructing block SOL, instruction signals Vsm, Vm1, Vm2, Vrn of the electromagnetic valves VSM, VM1, VM2, VRN are calculated based on the braking operation volume Bpa and a control signal Pmd. In the electromagnetic valve driving means DRS, the flowing states (open positions) and the interrupted states (closed positions) of the electromagnetic valves VSM, VM1, VM2, VRN are selectively produced (controlled) based on the instruction signals Vsm, Vm1, Vm2, Vrn.

In the piston return control block PMD, in a case where the braking operation volume Bpa is equal to or greater than a prescribed value bpm, the connection valve VRN is brought to the closed position and the control signal Pmd for controlling the first and second electric motors MT1, MT2 based on the first and second instruction electric conduction amounts Is1, Is2 and the first and second feedback electric conduction amounts Ib1, Ib2 (for executing the aforementioned normal electric conduction) is calculated based on the braking operation volume Bpa and outputted. On the other hand, in a case where the braking operation volume Bpa is less than the prescribed value bpm, the connection valve VRN is brought to the open position and the control signal Pmd for executing the specific electric conduction on one of the first and second electric motors MT1, MT2 is calculated and outputted.

In the electromagnetic valve instructing block SOL, the states of electrical conduction or non-conduction of the respective electromagnetic valves (VSM, etc.) are controlled based on the braking operation volume Bpa and the control signal Pmd. Firstly, the occurrence of the braking operation by the driver is determined based on the operation volume Bpa. Specifically, "braking operation occurring (the braking operation is being performed)" is determined in a case where the operation volume Bpa is equal to or greater than the prescribed value bp0, and "no braking operation (the braking operation is not performed)" is determined in a case where the operation volume Bpa is less than the prescribed value bp0.

In the electromagnetic valve instructing block SOL, in a case where the condition "braking operation occurring (that is, Bpa≥bp0)" is satisfied, the instruction signals Vsm, Vm1, Vm2 are sent to the electromagnetic valve driving means DRS so that the driving states of the electromagnetic valves VSM, VM1, VM2 are switched from non-conducted state to conducted state. Moreover, in the electromagnetic valve instructing block SOL, the instruction signals Vrn is sent to the electromagnetic valve driving means DRS so that the driven state of the electromagnetic valve VRN is switched between conduction and non-conduction states based on the control signal Pmd.

In the electromagnetic valve driving means DRS, the open/close states of the electromagnetic valves VSM, VM1, VM2, VRN are switched based on the instruction signals Vsm, Vm1, Vm2, Vrn. Further, the electromagnetic valve electric conduction amount acquiring means (current sensor) ISA for acquiring the electric conduction amounts Isa to the electromagnetic valves VSM, VM1, VM2, VRN is provided in the driving means DRS.

In the electronic control unit ECU as well, the power is supplied from the power source (BAT, etc.) and the functions thereof are thereby executed. Due to this, in a case where the power source is failing (that is, the supplied power is insufficient), the ECU itself does not function, and the power supply to the electric motors MT1, MT2 and the electromagnetic valves VSM, VM1, VM2, VRN may not be carried out. Due to this, as the electromagnetic valves VSM, VRN, normally-closed electromagnetic valves (NC valves) are employed, and normally-open electromagnetic valves (NO valves) are employed as the electromagnetic valves VM1, VM2. As a result, in the case where the power source is in the unsuitable state, the connection between the master cylinder MCL and the simulator SSM is interrupted, and the connections between the master cylinder MCL and the wheel cylinders (WCfl, WCfr, etc.) may be ensured.

<Example of Electric Motor Driving Means DRM (Example of Three-Phase Brushless Motor)>

Figure 5:
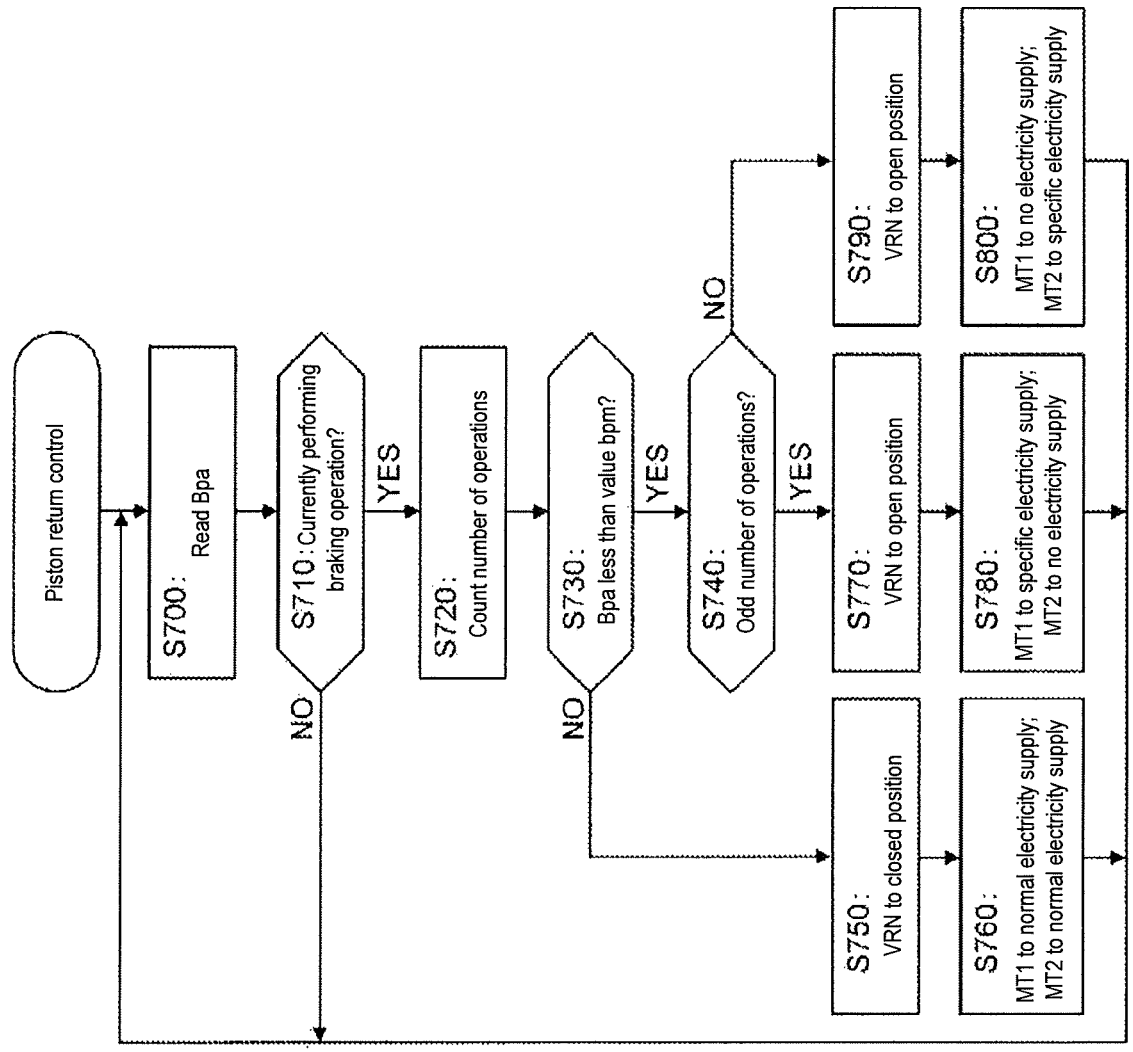
FIG. 5 is a flow chart diagram for explaining piston return control.

FIG. 5 is an example of the driving means (driving circuit) DRM for a case where the first electric motor MT1 is a brushless motor. The electric motor driving means DRM is an electric circuit that drives the first electric motor MT1, and is configured of the bridge circuit configured of six switching elements SWA to SWF, a pulse width modulating block PWM configured to execute pulse width modulation based on the first target electric conduction amount It1, a switching controlling block SWT configured to control electricity-supplied states/non-electricity-supplied states of SWA to SWF based on a first duty ratio Du1 determined by PWM, and the electric conduction amount acquiring means IMA.

The six switching elements SWA to SWF are elements capable of turning on/off parts of the electric circuit, and for example, MOSFETs can be used. In the brushless motor, a first position acquiring means MK1 acquires a rotor position (rotation angle) Mk1 of the first electric motor MT1. Further, with the switching elements SWA to SWF configuring the bridge circuit (three-phase bridge circuit) being controlled, directions of coil conduction amounts (that is, excitation directions) of a U phase (Tu terminal), a V phase (Tv terminal), and a W phase (Tw terminal) are switched sequentially based on the first rotation angle Mk1, and the first electric motor MT1 is thereby rotary driven. That is, the rotation direction of the brushless motor (forward direction Fwd or reverse direction Rvs) is determined according to a relationship of the rotor and positions of excitation. Here, the forward direction Fwd of the first electric motor MT1 is a rotary direction corresponding to the increase of the brake fluid pressure, and the reverse direction Rvs of the first electric motor MT1 is a rotary direction corresponding to the decrease of the brake fluid pressure.

In the pulse width modulating block PWM, instruction value (target value) for executing the pulse width modulation for each switching element is calculated based on the first target electric conduction amount It1. A pulse width duty ratio (ratio of on-time period within a cycle) is determined based on a magnitude of the first target electric conduction amount It1 and a preset characteristic (calculation map). Together with this, the rotary direction of the first electric motor MT1 is determined based on the sign of the first target electric conduction amount It1 (being positive or negative sign). For example, the rotary direction of the first electric motor MT1 is set as that the forward direction Fwd is the positive (plus) value and the reverse direction Rvs is the negative (minus) value. Since the final output voltage is determined according to the input voltage (voltage of the battery BAT) and the first duty ratio Du1, the rotary direction and the output torque of the first electric motor MT1 is thereby controlled.

In the switching controlling block SWT, driving signals Sa to Sf for setting the respective switching elements configuring the bridge circuit in the on-state (electricity-supplied state) or off-state (non-electricity-supplied state) are calculated based on the first duty ratio (target value) Du1. By these driving signals Sa to Sf, the conduction and non-conduction states of the switching elements SWA to SWF are controlled. Specifically, conduction time within a cycle in the switching elements are set longer for larger first duty ratio Du1, resulting in larger current being supplied to the first electric motor MT1, and the output (rotational power) thereof becomes larger.

The electric conduction amount acquiring means (for example, current sensor) IMA is provided in the electric motor driving means DRM, and the actual electric conduction amount (for example, actual current value) Ima is acquired (detected). Further, in the switching controlling block SWT, a so-called current feedback control is executed. The first duty ratio Du1 is modified (finely adjusted) based on the deviation ΔIm between the actual electric conduction amount Ima and the first target electric conduction amount It1. Highly accurate motor control can be achieved by this current feedback control.

<Process in Electromagnetic Valve Controlling Part>

The process in the piston return control block PMD will be described with reference to a flow diagram of FIG. 5. In the piston return control block PMD, the piston return control is executed, in which one side of the first and second electric motors MT1, MT2 is brought to the non-electricity-supplied state and the other side thereof is electrically conducted under a state in which the connection valve VRN is brought to the open position, by which the fluid pressure of the control cylinder on the one side is increased and the control piston on the other side is thereby returned to the initial position. Thus, in the piston return control block PMD, the control signal Pmd for driving the first and second electric motors MT1, MT2 and the connection valve VRN is calculated; however, specific instruction contents of the signal Pmd will be herein described.

Firstly, in step S700, the braking operation volume Bpa is read. Next, the process proceeds to step S710.

In step S710, a determination is made on whether "braking or not" based on the braking operation volume Bpa. Specifically, it is determined as "braking" in a case where the braking operation volume Bpa is equal to or greater than the prescribed value bp0. Further, it is determined as "not braking (non-braking)" in a case where the braking operation volume Bpa is less than the prescribed value bp0. In the case where "braking" is affirmed in step S710 (case of "YES"), the process proceeds to step S720. On the other hand, in the case where "braking" is denied in step S710 (that is, non-braking in the case of "NO"), the process returns to step S700.

In step S720, a number of the braking operation since the ignition switch has been turned on is counted. That is, a count number of the current braking operation in the incrementing counts thereof since a driving power source of the vehicle (for example, an engine) has been started is obtained. Next, the process proceeds to step S730.

In step S730, a determination is made on whether "the braking operation volume Bpa is less than the prescribed value bpm or not" based on the braking operation volume Bpa. In a case where the braking operation volume Bpa is equal to or greater than the prescribed value bpm and "Bpa<bpm" is denied (in case of "NO"), the process proceeds to step S750. In a case where the braking operation volume Bpa is less than the prescribed value bpm and "Bpa<bpm" is affirmed (in case of "YES"), the process proceeds to step S740.

In step S740, a determination is made on "whether the operated number of times is odd number or not" based on the count number in step S720. In a case where the operated number of times (count number) is an odd number and the determination of step S740 is affirmed (in case of "YES"), the process proceeds to step S770. On the other hand, in a case where the operated number of times is an even number and the determination of step S740 is denied (in case of "NO"), the process proceeds to step S790.

In step S750, the connection valve VRN is brought to the closed position. Then, the process proceeds to step S760, and the normal electric conduction is executed on the electric motors MT1, MT2. As aforementioned, in the normal electric conduction, the first and second instruction electric conduction amounts Is1, Is2 are controlled by the feedback of the first and second feedback electric conduction amounts Ib1, Ib2 and the first and second target electric conduction amounts It1, It2 are thereby determined. In steps S750, S760, the control signal Pmd is outputted to the electromagnetic valve instructing block SOL and the target electric conduction amount calculating block IMT so that the connection valve VRN is brought to the closed position and the first and second electric motors MT1, MT2 are subjected to the normal electric conduction. After termination of step S760, the process returns to step S700.

In step S770, the connection valve VRN is brought to the open position. Then the process proceeds to step S780, and the specific electric conduction is executed on the first electric motor MT1 and the second electric motor MT2 is brought to be non-conducted. That is, in steps S770, S780, the control signal Pmd is outputted to the electromagnetic valve instructing block SOL and the target electric conduction amount calculating block IMT so that the connection valve VRN is brought to the open position, the first electric motor MT1 is subjected to the specific electric conduction, and the second electric motor MT2 is brought to be non-conducted during the braking operation being the odd number of times counting from the time point of having started the ignition switch. Here, in the specific electric conduction of the first electric motor MT1, the electric conduction amount is determined based on a preset calculation characteristic and the braking operation volume Bpa. After termination of step S780, the process returns to step S700. The calculation characteristic in the specific electric conduction allows the electric conduction amount that increases according to the increase in the braking operation volume Bpa and that is larger as compared to the case of the normal electric conduction to be calculated.

In step S790, the connection valve VRN is brought to the open position. Then the process proceeds to step S800, and the first electric motor MT1 is brought to be non-conducted and the specific electric conduction is executed on the second electric motor MT2. That is, in steps S790, S800, the control signal Pmd is outputted to the electromagnetic valve instructing block SOL and the target electric conduction amount calculating block IMT so that the connection valve VRN is brought to the open position, the first electric motor MT1 is brought to be non-conducted, and the second electric motor MT2 is subjected to the specific electric conduction during the braking operation being the even number of times counting from the time point of having started the ignition switch. Here, similarly to step S780, in the specific electric conduction of the second electric motor MT2, the electric conduction amount is determined based on the preset calculation characteristic and the braking operation volume Bpa. After termination of step S800, the process returns to step S700.

As described above, in the initial stage of the braking operation (that is, when the braking operation volume Bpa is less than the value bpm), the connection valve VRN is brought to the flowing state and the electric motor on one side is brought to be non-conductive, and the two brake systems (piping) are pressurized by the electric motor on the other side (that is, the specific electric conduction is executed). Due to this, even if the control piston on the one side has not fully returned to the initial position (abutting position with the stopper portion Stp), it is forced to return to the initial position by this pressurization. As a result, the return springs SPR having weak spring force (that is, having a low spring constant) may be employed. Alternatively, the return springs may wholly be omitted. As a result, the electric motors can be made compact.

Moreover, the braking number of times since when the driving power source of the vehicle has been started is counted, and the specific electric conduction as aforementioned is executed alternately in the two brake systems H1, H2. Due to this, the first and second control pistons PS1, PS2 are alternately returned to their initial positions for every braking operation. Thus, the two control pistons PS1, PS2 may be surely returned to their initial positions.

The process (piston return control) of bringing the electric motor on the one side to be non-conducted and the electric motor on the other side to be in specific electric conduction under the state in which the connection valve VRN is in the open position may be executed not only in the initial stage of the braking operation, but may be executed also immediately before termination of the braking when the condition of "the braking operation volume Bpa being less than the value bpm" is satisfied. In the piston return control immediately before termination of the braking as well, the same effects as aforementioned can be achieved.

<Second Embodiment of Braking Control Device According to the Present Invention>

Figure 6:
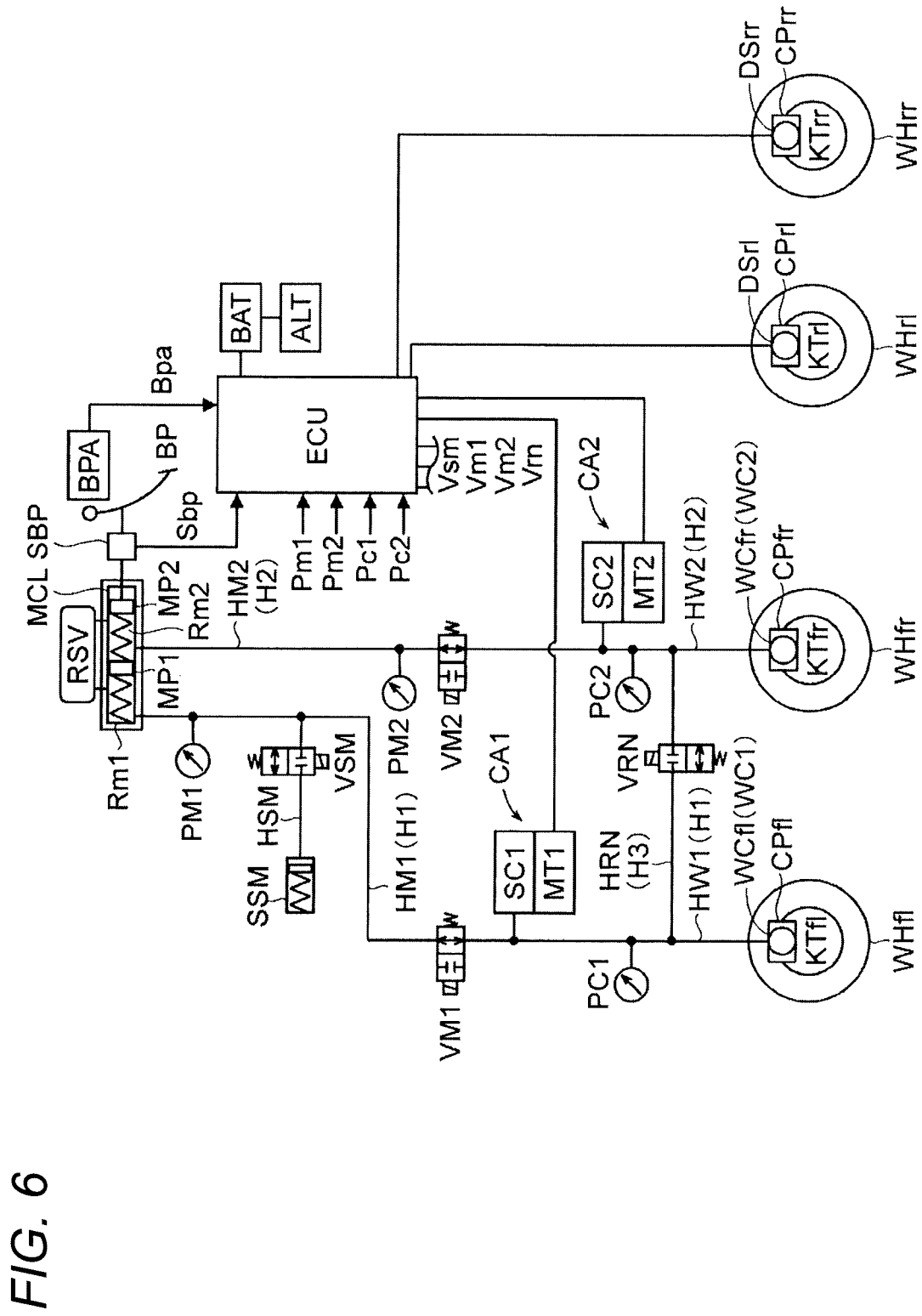
FIG. 6 is an overall configurational diagram showing a second embodiment of a braking control device for a vehicle according to the present invention.

Next, a second embodiment of the present invention will be described with reference to an overall configurational diagram of FIG. 6. In the first embodiment (see FIG. 1), the four wheel cylinders WCfl, WCfr, WCrl, WCrr are pressurized by the pressure-regulating mechanisms CA1, CA2; however, in the second embodiment, the front wheel cylinders WCfl, WCfr are pressurized by the pressure-regulating mechanism CA1, CA2 and the brake torque is applied thereto. Further, the rear wheels WHrl, WHrr are given the brake torque by electric brake means DSrl, DSrr that do not use fluid. Thus, the wheel cylinders WCrl, WCrr do not exist for the rear wheels WHrl, WHrr, and the fluid pipe from the master cylinder MCL to the rear wheel cylinders WCrl, WCrr also does not exist. That is, fluid paths (piping), electromagnetic valves, and wheel cylinders corresponding to the rear wheel do not exist.

In the respective drawings and descriptions using the same, similarly to the above, the members (constituent features) given the same reference signs such as MCL exhibit the same function. In addition, similarly to the above, the letters added to the end of the signs of the respective constituent features indicate which one of the four wheels corresponds. Specifically, as the added letters, "fl" indicates a "left front wheel", "fr" indicates a "right front wheel", "rl" indicates a "left rear wheel", and "rr" indicates a "right rear wheel," respectively.

Since the constituent features given the same reference signs are same as those of the first embodiment, the description will be simplified by describing mainly of differing portions.

The master cylinder MCL (first master cylinder chamber Rm1) and the left front wheel cylinder WCfl (corresponding to first wheel cylinder WC1) are connected by the first fluid path H1. The first master cylinder shutoff valve VM1 being a two-position electromagnetic valve is interposed in the first fluid path H1. The first pressure-regulating mechanism CA1 driven by the first electric motor MT1 is connected to the first fluid path H1 between the first master cylinder shutoff valve VM1 and the left front wheel cylinder WCfl.

Further, the master cylinder MCL (second master cylinder chamber Rm2) and the right front wheel cylinder (corresponding to second wheel cylinder WC2) WCfr are connected by the second fluid path H2. The second master cylinder shutoff valve VM2 being a two-position electromagnetic valve is interposed in the second fluid path H2. The second pressure-regulating mechanism CA2 driven by the second electric motor MT2 is connected to the second fluid path H2 between the second master cylinder shutoff valve VM2 and the right front wheel cylinder WCfr. Further, the master cylinder MCL is connected to the simulator SSM via the simulator shutoff valve VSM being a two-position electromagnetic valve.

The first pressure-regulating mechanism CA1 and the second pressure-regulating mechanism CA2 are hydrodynamically connected by the connection fluid path (brake piping) HRN. Further, the normally-closed connection valve VRN is interposed on the connection fluid path HRN (H3). In a state where the connection valve VRN is in the open position, the connection fluid path HRN is in a flowing state, and when it is in the closed position, the connection fluid path HRN is in an interrupted state.

In the second embodiment as well, similarly to the first embodiment, at the beginning of the braking operation when the braking operation volume Bpa is less than the value bpm, the electric motor on the one side is brought to be non-conductive, and the two brake systems are pressurized by the specific electric conduction of the electric motor on the other side under the state in which the connection valve VRN is in the open position. Due to this, the control piston on the one side is forced to return to the initial position. Due to this, the return springs SPR having the weak spring force (that is, having the low spring constant) may be employed, or the abolition of the return springs can be achieved, and the electric motors can be made compact. In the specific electric conduction, the electric conduction amount is calculated based on the preset calculation characteristic (characteristic which increases according to the increase in Bpa) and the braking operation volume Bpa, and this electric conduction amount is large as compared to the case of the normal electric conduction.

Further, the braking number of times since when the ignition switch has been started is counted, and the piston return control is executed alternately in the left and right front wheels. Due to this, the control pistons PS1, PS2 are surely returned to their initial positions.

Moreover, similarly to the first embodiment, the piston return control may be executed in at least one of occasions when "the braking operation volume Bpa being less than the value bpm" is satisfied, at the beginning of the braking operation, and immediately before the termination of the braking operation.

<Electric Brake Means Provided on Rear Wheels in Second Embodiment>

Figure 7:
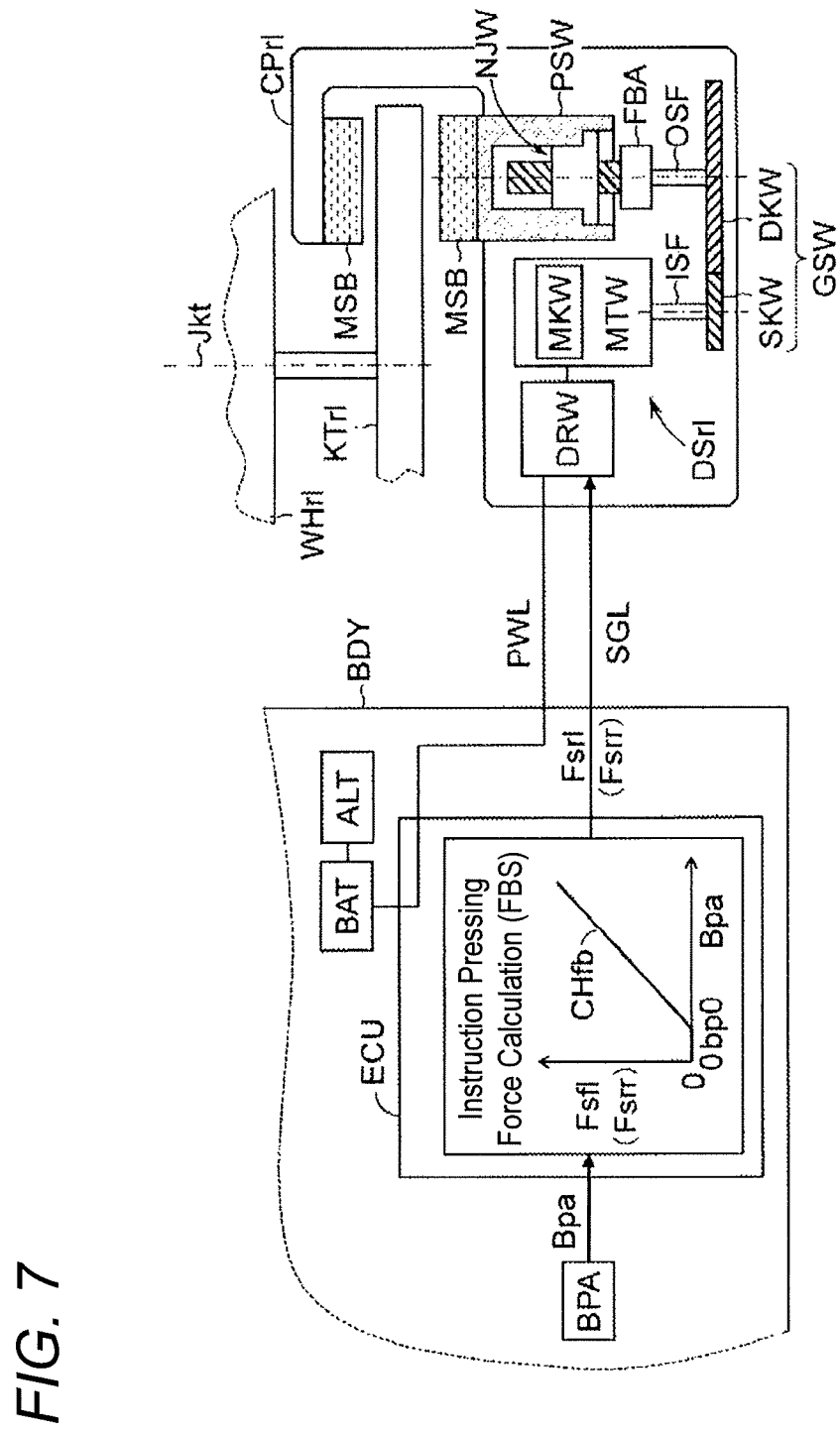
FIG. 7 is a schematic diagram for explaining an electric brake means for rear wheels.

The electric brake means provided on the rear wheels will be described with reference to a schematic diagram of FIG. 7, with the electric brake means DSrl for the left rear wheel as an example. The electric brake means DSrl is driven by an electric motor MTW (that is, the brake torque of the rear wheel is adjusted). Here, the electric motor MTW is termed "wheel-side electric motor" to distinguish it from the first and second electric motors MT1, MT2 for driving the first and second pressure-regulating mechanisms CA1, CA2 provided on the vehicle body side. Similarly to the above, the constituent features given the same reference signs exhibit the same function, so the description thereof will be omitted.

The vehicle is provided with the brake operation member BP, the electronic control unit ECU and the electric brake means (brake actuator) DSrl. The electronic control unit ECU and the electric brake means DSrl are connected by a signal cable (signal line) SGL and a power cable (power line) PWL, and a driving signal and power for the electric motor MTW dedicated to the electric brake means DSrl are thereby supplied.

In addition to the aforementioned suitability determining block HNT, etc., the electronic control unit ECU is provided with an instruction pressing force calculating block FBS. A target value (instruction pressing force) Fsrl for driving the electric motor MTW dedicated to the electric brake means DSrl is calculated by the instruction pressing force calculating block FBS. Specifically, in the instruction pressing force calculating block FBS, the instruction pressing force Fsrl for the right rear wheel WHrl is calculated based on the braking operation volume Bpa and a preset instruction pressing force calculation characteristic CHfb. The instruction pressing force Fsrl is a target value of the pressing force, which is force for the frictional member (brake pad) MSB to press the rotary member (brake disk) KTrl in the electric brake means DSrl for the right rear wheel. The instruction pressing force Fsrl is sent to DSrl on the wheel side through a serial communication bus SGL.

The electric brake means DSrl for the left rear wheel is configured of the brake caliper CPrl, a pressing piston PSW, the wheel-side electric motor MTW, a rotation angle detecting means MKW, a reduction gear GSW, the output member OSF, the screw member NJW, a pressing force acquiring means FBA, and the drive circuit DRW.

The brake caliper CPrl is configured to interpose the rotary member (brake disk) KTrl therein via two frictional members (brake pads) MSB. The pressing piston (brake piston) PSW is slid within the caliper CPrl, and is reciprocated toward the rotary member KTrl. The pressing piston PSW presses the frictional members MSB onto the rotary member KTrl to generate frictional force. Since the rotary member KTrl is fixed to the rear wheel WHrl, this frictional force adjusts the braking force on the left rear wheel WHrl.

The wheel-side electric motor MTW for driving the electric brake means DSrl generates electric power for pressing the frictional members MSB against the rotary member KTrl. Specifically, an output of the electric motor MTW (rotational power about a motor axis) is transmitted to the output member OSF through the reduction gear GSW. Rotational power (torque about shaft axis) of the output member OSF is converted to linear motion force (thrusting force in a direction of center axis of PSW) by a motion converting member (for example, the screw member) NJW, and is transmitted to the pressing piston PSW.

The rotation angle acquiring means (for example, rotation angle sensor) MKW for the wheel-side electric motor MTW is provided. Further, the pressing force acquiring means FBA is provided in order to acquire (detect) a reaction force (reaction) of the force (pressing force) Fba of the pressing piston PSW pressing the frictional member MSB. Further, a pressing force feedback control is executed based on the target value Fsrl and the actual value Fba of the pressing force.

The driving means (driving circuit) DRW drives the wheel-side electric motor MTW based on the instruction pressing force (signal) Fsrl sent from the instruction pressing force calculating block FBS. Specifically, the driving means DRW is provided with the bridge circuit for driving the wheel-side electric motor MTW, and rotary direction and the output torque of the electric motor MTW are controlled by driving signals for respective switching elements calculated based on the target value Fsrl.

As above, the electric braking device DSrl for the left rear wheel WHrl is described. Since the electric braking device DSrr for the right rear wheel WHrr is same as the electric braking device DSrl, the description will be omitted. The details of the electric braking device DSrr can be described by replacing the added letter "rl" of the respective reference signs to the added letter "rr".

In the first embodiment, the first and second fluid pressure units HU1, HU2 are provided to allow the brake torque to be adjusted independently in each wheel in the anti-skidding control, etc.; however, in the second embodiment, the first pressure-regulating mechanism CA1 can adjust the fluid pressure of the wheel cylinder WCfl independently from the fluid pressure adjustment of the wheel cylinder WCfr by the second pressure-regulating mechanism CA2. Thus, in the second embodiment, the first and second fluid pressure units HU1, HU2 can be omitted.

The invention claimed is:

1. A braking control device for a vehicle, the device comprising:
   an operation volume acquiring means configured to acquire an operation volume of a brake operation member of the vehicle;
   a first wheel cylinder configured to apply brake torque on one of front wheels of the vehicle;
   a second wheel cylinder configured to apply brake torque on the other of the front wheels of the vehicle;
   a first pressure-regulating mechanism configured to pressurize brake fluid in the first wheel cylinder by motion of a first control piston inside a first control cylinder, the first control piston being configured to be driven by a first electric motor;

a second pressure-regulating mechanism configured to pressurize brake fluid in the second wheel cylinder by motion of a second control piston inside a second control cylinder, the second control piston being configured to be driven by a second electric motor;

an opening/closing means interposed on a connection fluid path connecting the first wheel cylinder and the second wheel cylinder, and configured to selectively produce a flowing state and an interrupted state of the brake fluid between the first wheel cylinder and the second wheel cylinder; and a control means configured to control the first and second electric motors and the opening/closing means based on the operation volume, wherein the control means:

brings the opening/closing means to be in the flowing state, brings the first electric motor to be in an electricity-supplied state, and brings the second electric motor to be in a non-electricity-supplied state in a case where the operation volume is less than a prescribed value; and brings the opening/closing means to be in the interrupted state, and brings the first and second electric motors to be in the electricity-supplied state in a case where the operation volume is equal to or greater than the prescribed value.

2. The braking control device for a vehicle according to claim 1, further comprising a master cylinder driven by the brake operation member, wherein the first pressure-regulating mechanism is configured of: the first control cylinder including a first inner hole; the first control piston fitted in the first inner hole of the first control cylinder in a fluid-tight manner and defining a first control cylinder chamber communicating with the first wheel cylinder in the first inner hole; the first electric motor configured to reciprocate the first control piston in an axial direction within the first inner hole to increase and decrease a volume of the control cylinder chamber; and a first return spring biasing the first control piston toward a side that increases the volume of the control cylinder chamber, and the second pressure-regulating mechanism is configured of: the second control cylinder including an second inner hole; the second control piston fitted in the second inner hole of the second control cylinder in a fluid-tight manner and defining a second control cylinder chamber communicating with the second wheel cylinder in the second inner hole; the second electric motor configured to reciprocate the second control piston in an axial direction within the second inner hole to increase and decrease a volume of the control cylinder chamber; and a second return spring biasing the second control piston toward a side that increases the volume of the control cylinder chamber.

* * * * *